United States Patent
Brokke et al.

[11] 3,872,157
[45] Mar. 18, 1975

[54] SUBSTITUTED ANILIDE CARBAMATES

[75] Inventors: Mervin E. Brokke, Richmond; Eugene G. Teach, El Cerrito, both of Calif.

[73] Assignee: Stauffer Chemical Company, New York, N.Y.

[22] Filed: Oct. 23, 1967

[21] Appl. No.: 677,050

[52] U.S. Cl. .................. 260/479 C, 71/88, 71/106, 71/111, 260/347.4
[51] Int. Cl. .......................................... C07c 125/06
[58] Field of Search ............................... 260/479 C

[56] References Cited
OTHER PUBLICATIONS
FMC Chemical Abstracts, Vol. 68 (1968), page 779964–Abstract of Neth. appl. 6,614,472 (April 17, 1967).

*Primary Examiner*—James A. Patten
*Attorney, Agent, or Firm*—Harry A. Pacini; Daniel C. Block; Edwin H. Baker

[57] ABSTRACT

New compounds corresponding to the formula:

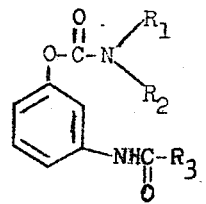

in which $R_1$ is hydrogen, lower alkyl, or lower alkenyl; $R_2$ is alkyl, lower alkenyl, cycloalkyl, phenyl or substituted phenyl in which the substituents are lower alkyl, lower alkoxy, nitro or halogen; and $R_3$ is hydrogen, lower alkyl, cycloalkyl having 3 to 4 carbon atoms, inclusive, halogenated lower alkyl, lower alkenyl, furyl or benzyl; provided that when $R_1$ is hydrogen or lower alkyl $R_3$ is other than lower alkyl and further provided that when $R_1$ is hydrogen and $R_2$ is methyl, $R_3$ is other than hydrogen, halogenated lower alkyl, cycloalkyl or lower alkenyl. The above-defined compounds are effective herbicides, particularly for the control of grasses and broadleaf plants with both pre-emergence and post-emergence activity. Representative compounds are: 3'-(N-n,propylcarbamoyloxy)cyclopropane carboxanilide, 3'-(N-n-butylcarbamoyloxy)-crotonanilide, 3'-(N-ethylcarbamoyloxy)furoyl anilide, 3'-(N,N-diallylcarbamoyloxy) propionanilide, 3'-(N-n-propylcarbamoyloxy)vinylacetanilide and 3'-(N-i-propylcarbamoyloxy)2-bromo isobutyranilide.

6 Claims, No Drawings

SUBSTITUTED ANILIDE CARBAMATES

This invention relates to certain herbicidally active substituted anilide carbamates. More specifically, this invention relates to certain new compounds and the use as active herbicidal substances of certain substituted anilide carbamates.

The novel compounds of the present invention correspond to the general formula:

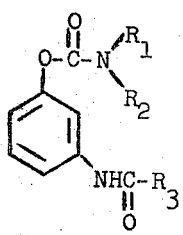

in which $R_1$ is a member selected from the group consisting of hydrogen, lower alkyl, and lower alkenyl; $R_2$ is a member selected from the group consisting of alkyl, lower alkenyl, cycloalkyl, phenyl and substituted phenyl wherein said substituents are members selected from the group consisting of lower alkyl, lower alkoxy, nitro and halogen; and $R_3$ is a member selected from the group consisting of hydrogen, lower alkyl, cycloalkyl, having 3 to 4 carbon atoms, inclusive, halogenated lower alkyl, lower alkenyl, furyl and benzyl. Provided that when $R_1$ is hydrogen or lower alkyl, $R_3$ is other than lower alkyl; and further provided that when $R_1$ is hydrogen and $R_2$ is methyl, $R_3$ is other than hydrogen, halogenated lower alkyl, cycloalkyl, or lower alkenyl.

The term alkyl, as used herein, preferably includes those members of the group which contain from 1 to about 8 carbon atoms, inclusive, in both straight chain and branched chain configurations. Examples of such groups are methyl, ethyl, propyl, butyl, isopropyl, n-hexyl, n-heptyl, isooctyl and n-octyl. The terms lower alkyl and lower alkoxy preferably include members of the groups having from 1 to 6 carbon atoms, inclusive. The term cycloalkyl preferably includes members of the group having from 3 to 5 carbon atoms, inclusive, for example, cyclopropyl, cyclobutyl and cyclopentyl. The term lower alkenyl preferably includes those members of the group containing at least one double bond and containing from 2 to 4 carbon atoms, inclusive.

The compounds of this invention are prepared by one of several general methods. One such general method useful for the preparation of 3'-(N-mono-substituted carbamoyloxy) compounds, herein disclosed, is the condensation between the appropriate 3'-hydroxy substituted anilide and the appropriate isocyanate. Another general method for the preparation of 3'-(N,N-disubstituted carbamoyloxy) compounds, herein disclosed, is the condensation between the appropriate 3'-alkylamidophenylchloroformate and an appropriate disubstituted amine. These reactions proceed readily in the liquid phase. The employment of a solvent is also useful, facilitating processing, as well as agitation of the reactants. An inert organic solvent, e.g. chloroform, ether, dioxane, tetrahydrofuran or acetone, is employed as a reaction medium. It is preferred to carry out the reaction of the hydroxyanilide and isocyanate, in the presence of a catalyst, such as triethylenediamine and di-n-butyl tin dilaurate. A temperature that permits operation in the liquid phase and which is between room temperature and reflux temperature of the solvent if one is used, is preferably employed in these reactions.

Compounds of the present invention are prepared in accordance with the following illustrative examples.

EXAMPLE I

Preparation of 3'-(N-n-propylcarbamoyloxy)cyclopropane carboxanilide.

To 10.6 g. (0.06 mole) of 3'-hydroxy cyclopropane carboxanilide dissolved in 100 ml. of acetone is added 5.6 g. (0.066 mole) of n-propyl isocyanate and about 100 mg. of triethylene diamine and about 100 mg. of di-n-butyltindilaurate. The mixture is heated at reflux for 2 hours. The mixture is worked up to recover the crystalline product. There is obtained a yield of 12.4 g. (79% of theory) of the title compound; m.p. 168°–170° C.

EXAMPLE II

Preparation of 3'-(N-n-butyl carbamoyloxy) crotonanilide

To 9.9 g. (0.056 mole) of 3'-hydroxy crotonanilide dissolved in 100 ml. of acetone is added 6.0 g. (0.061 moles) of n-butylisocyanate and about 100 mg. of triethylene diamine and about 100 mg. of dibutyltin dilaurate. The mixture is heated at reflux for 2 hours. The mixture is worked up to recover the crystalline product. There is obtained a yield of 10.8 g. (70% of theory) of title compound, m.p. 138°–140°C.

EXAMPLE III

Preparation of 3'-(N-ethyl carbamoyloxy)furoyl anilide

To 10.2 g. (0.05 moles) of 3'-hydroxy furoyl anilide is dissolved in 100 ml. of acetone containing about 100 mg. of triethylene diamine and about 100 mg. of di-n-butyltin dilaurate was added 4 g. (0.056 moles) of ethyl isocyanate. The mixture is heated at reflux for 2 hours. The crystalline product is recovered by evaporation of the acetone under vacuum. The crude product, is redissolved in acetone, precipitated with water, and dried. There is obtained a yield of 9.5 g. (74% of theory) of the title compound, m.p. 146°–147°C.

EXAMPLE IV

Preparation of 3'-(N,N-diallylcarbamoyloxy)propionanilide

Diallyl amine 21 g. (.19 moles) is added dropwise to a tetrahydrofuran solution containing 22.8 g. (0.1 mole) of 3'-propionamido phenyl chloroformate. The mixture is stirred for 1 hour after addition is complete. The THF is then removed under vacuum. The residue is poured into water and the oily product taken up in methylene chloride, washed with acid and base and dried over magnesium sulfate. The solvent is evaporated under vacuum to give a thick oily liquid, $n_D^{30}$ 1.5390. The yield of the title compound is 16.4 g. (57% of theory).

EXAMPLE V

3'-(N-n-propylcarbamoyloxy)vinylacetanilide

To 12.4 g. (0.07 moles) of 3'-hydroxyvinyl acetanilide dissolved in 100 ml. of acetone containing about 100 mg. of triethylene diamine and about 100 mg. of dibutyltin dilaurate is added 6.5 g (0.077 moles) of n-propyl isocyanate. The mixture is heated at reflux for two hours. The crystalline product is recovered. There is obtained a yield of 14.0 g. (76% of theory), m.p. 149°–150°C.

EXAMPLE VI

Preparation of 3'-(N-i-propylcarbamoyloxy)2-bromo isobutyranilide

To 12.9 g. (0.05 moles) of 3'-hydroxy-2-bromo isobutyranilide dissolved in 100 ml. of acetone containing about 100 mg. of triethylene diamine and about 100 mg. of dibutyl tin dilaurate is added 4.7 g. (0.055 moles) of isopropyl isocyanate. The mixture is heated at reflux for two hours. The crystalline product is recovered. There is obtained a yield of 13.0 g. (76% of theory) of the title compound m.p. 179°–181°C.

The following is a table of the compounds which are prepared according to the aforedescribed procedures. Compound numbers have been assigned to them and are substituted for identification throughout the balance of the specification.

TABLE I

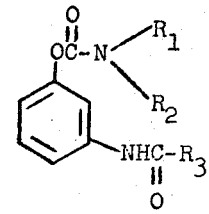

| Compound Number | $R_1$ | $R_2$ | $R_3$ | m.p. °C or $n_D^{30}$ |
|---|---|---|---|---|
| 1 | hydrogen | ethyl | vinyl | 142–144 |
| 2 | hydrogen | ethyl | 2-methylvinyl | 137–140 |
| 3 | hydrogen | ethyl | cyclopropyl | 191–194 |
| 4 | hydrogen | n-propyl | vinyl | 142–145 |
| 5 | hydrogen | n-propyl | 2-methylvinyl | 158–160 |
| 6 | hydrogen | n-propyl | cyclopropyl | 168–170 |
| 7 | hydrogen | i-propyl | vinyl | 177–180 |
| 8 | hydrogen | i-propyl | 2-methylvinyl | 168–173 |
| 9 | hydrogen | i-propyl | cyclopropyl | 210–214 |
| 10 | hydrogen | allyl | vinyl | 135–138 |
| 11 | hydrogen | allyl | 2-methylvinyl | 147–148 |
| 12 | hydrogen | allyl | cyclopropyl | 158–160 |
| 13 | hydrogen | n-butyl | vinyl | 151–153 |
| 14 | hydrogen | n-butyl | 2-methylvinyl | 138–140 |
| 15 | hydrogen | n-butyl | cyclopropyl | 160–163 |
| 16 | hydrogen | n-butyl | 1-chloroethyl | 153–157 |
| 17 | hydrogen | cyclohexyl | vinyl | 178–183 |
| 18 | hydrogen | cyclohexyl | 2-methylvinyl | 160–162 |
| 19 | hydrogen | cyclohexyl | cyclopropyl | 207–210 |
| 20 | hydrogen | ethyl | 2-furyl | 146–147 |
| 21 | hydrogen | propyl | 2-furyl | 138–140 |
| 22 | hydrogen | i-propyl | 1-methylvinyl | 168–171 |
| 23 | hydrogen | i-propyl | 2-furyl | 149–155 |
| 24 | hydrogen | allyl | 1-methylvinyl | 129–131 |
| 25 | hydrogen | cyclohexyl | 1-methylvinyl | 172–175 |
| 26 | hydrogen | allyl | 2-furyl | 126.5–128 |
| 27 | hydrogen | n-butyl | 2-furyl | 145–148 |
| 28 | hydrogen | 3-chlorophenyl | 2-methylvinyl | 162.5–165 |
| 29 | hydrogen | 3-chlorophenyl | cyclopropyl | 176–178 |
| 30 | hydrogen | n-propyl | cyclobutyl | |
| 31 | methyl | methyl | cyclopropyl | 139–140.5 |
| 32 | hydrogen | methyl | 2-furyl | |
| 33 | hydrogen | cyclohexyl | 2-furyl | 163–167 |
| 34 | hydrogen | phenyl | 2-methylvinyl | 154–156 |
| 35 | hydrogen | phenyl | cyclopropyl | 157–160 |
| 36 | hydrogen | phenyl | 2-furyl | 163.5–166 |
| 37 | allyl | allyl | ethyl | 1.5390 |
| 38 | hydrogen | methyl | benzyl | |
| 39 | hydrogen | ethyl | benzyl | 171.5–173 |
| 40 | hydrogen | n-propyl | benzyl | 179.5–181.5 |
| 41 | hydrogen | i-propyl | benzyl | 175.5–178 |
| 42 | hydrogen | allyl | benzyl | 165–167 |
| 43 | hydrogen | n-butyl | benzyl | 157–159 |
| 44 | hydrogen | phenyl | benzyl | 152–154 |
| 45 | hydrogen | cyclohexyl | benzyl | 192–194 |
| 46 | hydrogen | ethyl | allyl | 1.4627 |
| 47 | hydrogen | propyl | allyl | 149–150 |
| 48 | hydrogen | i-propyl | allyl | 99–101 |
| 49 | hydrogen | allyl | allyl | 131–133 |
| 50 | hydrogen | n-butyl | allyl | 138–140 |
| 51 | hydrogen | n-butyl | 3-chloropropyl | 141–144 |
| 52 | hydrogen | phenyl | 3-chloropropyl | 136–139 |
| 53 | hydrogen | i-propyl | 2-bromo-isopropyl | 179–181 |
| 54 | hydrogen | n-butyl | 2-bromo-isopropyl | 160–162 |
| 55 | hydrogen | phenyl | 2-bromo-isopropyl | 149–154 |
| 56 | ethyl | ethyl | cyclopropyl | 132–134 |
| 57 | hydrogen | tert-butyl | cyclopropyl | 189–192 |

Herbicidal Screening Tests

As previously mentioned, the herein described compounds produced in the above described manner are phytotoxic compounds which are useful and valuable in controlling various plant species. Compounds of this invention are tested as herbicides in the following manner.

Pre-emergence herbicide test. On the day preceding treatment, seeds of seven different weed species are planted in individual rows using one species per row across the width of the flat. The seeds used are hairy crabgrass (*Digitaria sanguinatis* (L.) Scop.), yellow foxtail (*Setaria glauca* (L.) Beauv.), watergrass (*Echinochloa crusgalli* (L.) Beauv.), wild oat (*Avena fatua* (L.), redroot pigweed (*Amaranthus retroflexus* (L.), Indian mustard (*Borassica juncea* (L.) Coss.) and curly dock (*Rumex crispus* (L.). Ample seeds are planted to give about 20 to 50 seedlings per row, after emergence, depending on the size of the plants. The flats are watered after planting. The spraying solution is prepared by dissolving 50 mg. of the test compound in 3 ml. of a solvent such as acetone containing 1% Tween 20 (polyoxy-ethylene sorbitan monolaurate) and diluting with a small amount of water. The following day each flat is sprayed at the rate of 20 pounds of the candidate compound per 80 gallons of solution per acre. An atomizer is used to spray the solution on the soil surface. The flats are placed in a greenhouse at 80°F. and watered regularly. Two weeks later the degree of weed control is determined by comparing the amount of germination and growth of each weed in the treated flats with weeds in several untreated control flats. The rating system is as follows:

- − = no significant injury (0–15 percent control)
- + = slight injury (25–35 percent control)
- ++ = moderate injury (55–65 percent control)
- +++ = severe injury or death (85–100 percent control)

An activity index is used to represent the total activity on all seven weed species. It is the sum of the number of plus marks, so that an activity index of 21 represents complete control of all seven weeds. The results of this test are reported in Table II.

Post-emergence herbicide test. Seeds of five weed species including hairy crabgrass, watergrass, wild oats, Indian mustard, and curly dock and one crop pinto beans (*Phaseolus vulgaris*), are planted in flats as described above for preemergence screening. The flats are placed in the greehouse at 72°–85°F. and watered daily with a sprinkler. About 10 to 14 days after planting when the primary leaves of the bean plant are almost fully expanded and the first trifoliate leaves are just starting to form, the plants are sprayed. The spray is prepared by weighing out 50 mg. of the test compound, dissolving it in 5 ml. of acetone containing 1% Tween 20 (polyoxy-ethylene sorbitan monolaurate) and then adding 5 ml. of water. The solution is sprayed on the foliage using an atomizer. The spray concentration is 0.5% and the rate would be approximately 20 lb/acre if all of the spray were retained on the plant and the soil, but some spray is lost so it is estimated that the application rate is approximately 12.5 lb/acre.

Beans are used to detect defoliants and plant growth regulators. The beans are trimmed to two or three plants per flat by cutting off the excess weaker plants several days before treatment. The treated plants are placed back in the greenhouse and care is taken to avoid sprinkling the treated foliage with water for three days after treatment. Water is applied to the soil by means of a slow stream from a watering hose taking care not to wet the foliage.

Injury rates are recorded 14 days after treatment. The rating system is the same as described above for the preemergence test where (−), (+), (++), and (+++) are used for the different rates of injury and control. The injury symptoms are also recorded. The maximum activity index for complete control of all the species in the post-emergence screening test is 18 which represents the sum of the plus marks obtained with the six plant species used in the test. The herbicide activity index is shown in Table II.

TABLE II

| Compound Number | Herbicidal Activity Screening 20 lb/acre | |
|---|---|---|
| | Pre emergence | Post emergence |
| 1 | 12 | 14 |
| 2 | 19 | 18 |
| 3 | 19 | 16 |
| 4 | 8 | 14 |
| 5 | 14 | 17 |
| 6 | 16 | 17 |
| 7 | 7 | 9 |
| 8 | 16 | 16 |
| 9 | 14 | 15 |
| 10 | 4 | 13 |
| 11 | 16 | 18 |
| 12 | 19 | 18 |
| 13 | 4 | |
| 14 | 15 | 17 |
| 15 | 17 | 16 |
| 16 | 3 | 14 |
| 17 | 3 | 8 |
| 18 | 12 | 16 |
| 19 | 5 | 12 |
| 20 | 19 | 18 |
| 21 | 11 | 18 |
| 22 | 12 | 18 |
| 23 | 12 | 18 |
| 24 | 14 | 17 |
| 25 | 9 | 13 |
| 26 | 12 | 17 |
| 27 | 12 | 15 |
| 28 | 5 | 12 |
| 29 | 1 | 10 |
| 31 | 15 | 16 |
| 33 | 4 | 11 |
| 34 | 12 | 18 |
| 35 | 4 | 16 |
| 36 | | 11 |
| 37 | 20 | 18 |
| 39 | 9 | 12 |
| 40 | 8 | 9 |
| 41 | 12 | 10 |
| 42 | 12 | 14 |
| 43 | 11 | 13 |
| 44 | 6 | 9 |
| 45 | | 9 |
| 46 | 21 | 18 |
| 47 | 21 | 18 |
| 48 | 21 | 18 |
| 49 | 21 | 18 |
| 50 | 21 | 18 |
| 51 | 11 | 14 |
| 52 | 1 | 9 |
| 53 | 12 | 17 |
| 54 | 15 | 17 |
| 55 | 1 | 15 |
| 56 | 19 | 18 |
| 57 | 21 | 18 |

The compounds of the present invention are used as pre-emergence or post-emergence herbicides and are applied in a variety of ways at various concentrations. In practice the compounds are formulated with an inert carrier, utilizing methods well-known to those skilled in the art, thereby making them suitable for application as dusts, sprays, or drenches and the like in the form and manner required. The mixtures can be dispersed in water with the aid of a wetting agent or they can be employed in organic liquid compositions, oil and water, water in oil emulsions, with or without the addition of wetting, dispersing or emulsifying agents. The amount applied depends upon the nature of the seeds or plants to be controlled and the rate of application varies from 1 to approximately 50 pounds per acre. One particularly advantageous way of applying the compound is a narrow band along a row crop straddling the row. In practice the compounds are formulated with an inert carrier utilizing methods well-known to those skilled in the art, thereby making them suitable for this particular application.

The concentration of a compound of the present invention, constituting an effective amount in best mode of administration in the utility disclosed is readily determinable by those skilled in the art. Various changes and modifications are possible without departing from the spirit and scope of the invention described herein and will be apparent to those skilled in the art to which it pertains. It is accordingly intended that the present invention shall only be limited by the scope of the claims.

What is claimed is
1. A compound having the formula:

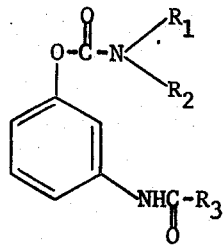

in which $R_1$ is selected from the group consisting of hydrogen, lower alkyl having from 1 to 6 carbon atoms, inclusive, and lower alkenyl having from 2 to 4 carbon atoms, inclusive; $R_2$ is selected from the group consisting of alkyl containing from 1 to 8 carbon atoms, inclusive, and lower alkenyl having 2 to 4 carbon atoms, inclusive; and $R_3$ is benzyl.

2. A compound according to claim 1 in which $R_1$ is hydrogen and $R_2$ is ethyl.

3. A compound according to claim 1 in which $R_1$ is hydrogen and $R_2$ is n-butyl.

4. A compound according to claim 1 in which $R_1$ is hydrogen and $R_2$ is n-propyl.

5. A compound according to claim 1 in which $R_1$ is hydrogen and $R_2$ is i-propyl.

6. A compound according to claim 1 in which $R_1$ is hydrogen and $R_2$ is allyl.

* * * * *